United States Patent [19]
Stephen et al.

[11] Patent Number: 5,402,630
[45] Date of Patent: Apr. 4, 1995

[54] YARN DRAW-OFF PIPE

[75] Inventors: Adalbert Stephen, Beilngries/Paulushofen; Josef Schermer, Unterstall, both of Germany

[73] Assignee: Rieter Ingolstadt Spinnereimaschinenbau AG, Ingolstadt, Germany

[21] Appl. No.: 137,575

[22] Filed: Oct. 15, 1993

[30] Foreign Application Priority Data

Oct. 16, 1992 [DE] Germany .............. 42 35 024.7

[51] Int. Cl.6 ............................................. D01H 4/40
[52] U.S. Cl. ............................... 57/417; 57/352; 57/356
[58] Field of Search ............... 57/414, 417, 352, 356

[56] References Cited

U.S. PATENT DOCUMENTS

| | | |
|---|---|---|
| 4,712,369 | 12/1987 | Vernon ........................... 57/417 |
| 4,829,762 | 5/1989 | Wassenhoven ................... 57/417 |
| 4,843,812 | 7/1989 | Raasch ......................... 57/414 X |
| 4,906,031 | 3/1990 | Vyse . | |
| 5,044,151 | 9/1991 | Pohn et al. ....................... 57/417 |
| 5,280,700 | 1/1994 | Haase et al. . | |

FOREIGN PATENT DOCUMENTS

| | | |
|---|---|---|
| 0200092 | 11/1986 | European Pat. Off. . |
| 2333401 | 1/1975 | Germany . |
| 2538258 | 3/1977 | Germany . |
| 3720967A1 | 1/1989 | Germany . |
| 3941383A1 | 6/1991 | Germany . |
| 4131665C2 | 8/1993 | Germany . |
| 2006636 | 1/1990 | Japan ................................. 57/417 |

*Primary Examiner*—Daniel P. Stodola
*Assistant Examiner*—William Stryjewski
*Attorney, Agent, or Firm*—Dority & Manning

[57] ABSTRACT

A yarn draw-off pipe for the withdrawal of a yarn, e.g. from a spinning rotor. To achieve easier replaceability of the yarn draw-off pipe, the latter is provided with an inclined surface upon which an elastic element bears to retain the yarn draw-off pipe. The inclined surface is placed in relation to the axis of the holder of the yarn draw-off pipe in such manner that the force of the elastic element exerted radially to the axis produces a force acting in axial direction, so that the yarn draw-off pipe is securely held in its holder.

10 Claims, 3 Drawing Sheets

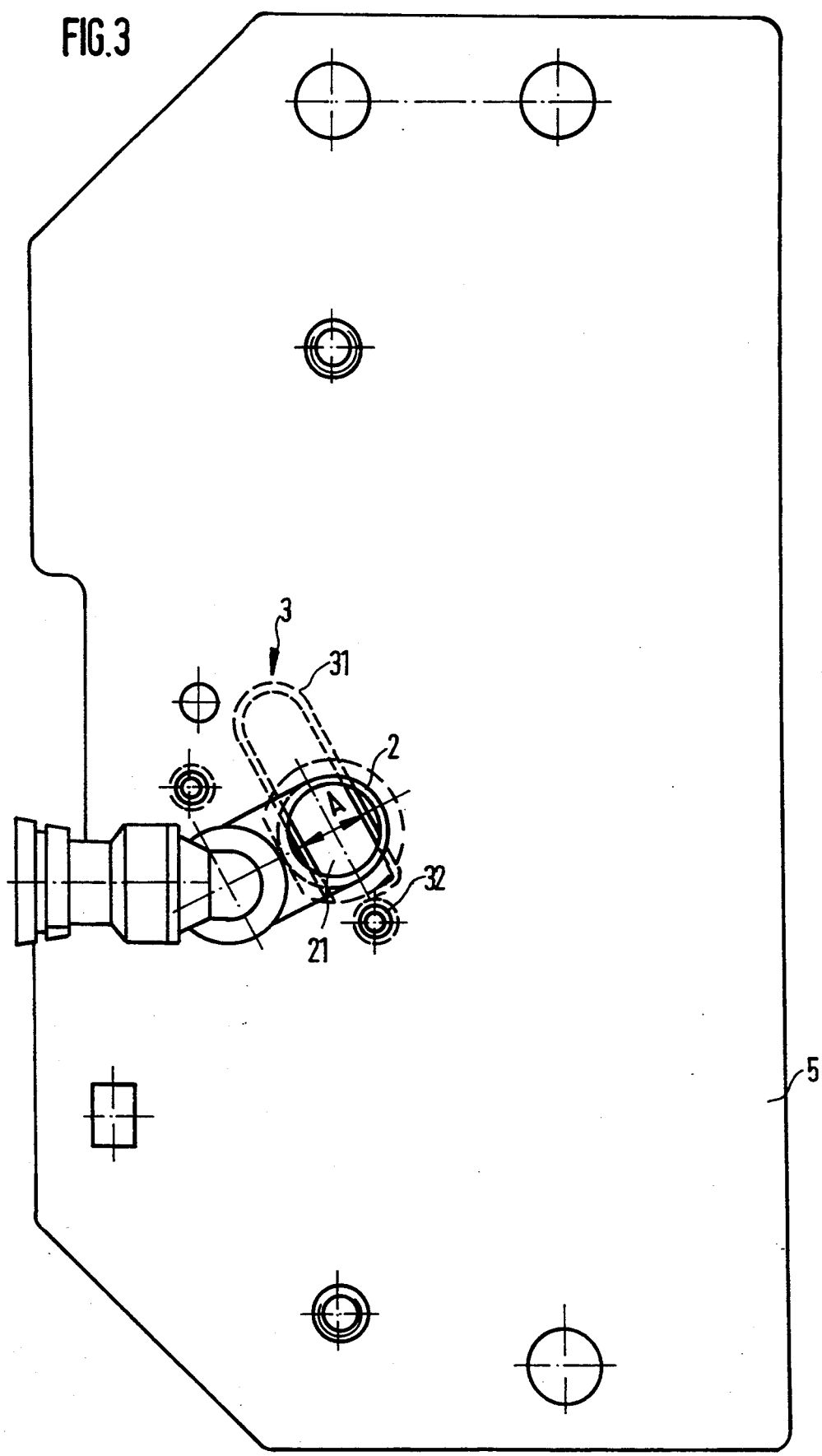

YARN DRAW-OFF PIPE

BACKGROUND OF THE INVENTION

The instant invention relates to a yarn draw-off pipe, as well to a holder for a yarn draw-off pipe on the housing of a spin box of a rotor spinning machine.

An open-end spinning device in which a draw-off nozzle for the withdrawal of the spun yarn is provided on the cover of the rotor housing and in which a yarn draw-off pipe is connected after the yarn draw-off nozzle is known from EP 0200 092. The yarn draw-off pipe is pressed axially against the yarn draw-off nozzle by means of a spring which bears upon it on its side away from the yarn draw-off nozzle.

A cover of an open-end rotor spinning device equipped with a yarn draw-off nozzle on its side towards the rotor and with an opening on its side away from the rotor into which a yarn draw-off pipe extends, and whereby the yarn can be guided through the draw-off pipe out of the rotor housing, is known from the German patent application P 41 31 665.7. The yarn draw-off pipe is held in its axial position similarly as in EP 0200 092 B1, by means of an elastic element which holds the yarn draw-off pipe with pre-stress in its axial position. The elastic element in this case is made in the form of a leaf spring which can be lifted and swivelled to remove the yarn draw-off pipe. This type of design of a yarn draw-off pipe and its attachment on the rotor cover has the disadvantage that when the yarn draw-off pipe is to be replaced, the leaf spring must first be swivelled away before the yarn draw-off pipe can be removed and replaced by a new one. This a disadvantage insofar as access is difficult through a housing cover to the back of the rotor cover. The operator must therefore lift the spring with one hand and pull out the yarn draw-off pipe or install a new yarn draw-off pipe with the other hand.

The holder of the yarn draw-off pipe is made in the form of a pipe-shaped element in this case, which is attached to a mounting plate to which the cover of the spin box is mounted. The holder extends axially into a bore of the rotor cover and guides the yarn draw-off pipe radially while it is held axially by a leaf spring. The holder for the yarn draw-off pipe may also be mounted on the rotor cover itself or be an integral part thereof as is shown in EP 0200 092 B1.

A yarn draw-off pipe with a surface for the bearing of an elastic element is known from DE-OS 25 38 258. The elastic element is used here to push the yarn draw-off pipe out of its holder. For disassembly, a safety element must be unscrewed for this. In another design the safety element is spring-loaded.

OBJECTS AND SUMMARY OF THE INVENTION

It is a principal object of the instant invention to design a yarn draw-off pipe in such manner that it can be exchanged easily, in particular without requiring any tool and without requiring the removal of safety elements, while the yarn draw-off pipe can nevertheless be fixed securely in its position. Another object of the invention is to design a holder for a yarn draw-off pipe so that it may be able to interact with a yarn draw-off pipe according to the invention.

Additional objects and advantages of the invention will be set forth in part in the following description, or will be obvious from the description, or may be learned by practice of the invention.

The design of the yarn draw-off pipe according to the invention makes it possible for a bearing surface to be created for an elastic element which bears radially upon the yarn draw-off pipe and produces an axial force in the process which pushes the yarn draw-off pipe in the direction of a yarn draw-off nozzle of an open-end spinning device, for example, and positions it securely in an axial direction. This design of the yarn draw-off pipe makes it possible to provide an elastic element in such a manner that it need not be removed or swivelled in order to pull the yarn draw-off pipe out of its holder. The elastic element slides along the inclined surface until the yarn draw-off pipe is freed. It is not required to lift the elastic element from the yarn draw-off pipe because this occurs automatically when the yarn draw-off pipe moves in an axial direction. To introduce and pull out the yarn draw-off pipe from its holder, no tools are necessary. This can be accomplished with one hand. This is especially advantageous because the yarn draw-off pipe on the spin box of a spinning machine is not easily accessible. It is especially advantageous for the bushing of the yarn draw-off pipe to be cylindrical and for the inclined surface to be conical. It is then possible to first rotate the yarn draw-off pipe in its holder and to then pull it out of the holder.

If a second inclined surface is attached to the bushing and is inclined in an opposing direction and located in the area of the front of the yarn draw-off pipe, it is especially easy to disassemble it, and in particular to assemble it again. When the yarn draw-off pipe is introduced, the inclined surface first pushes the elastic element radially towards the outside, so that the yarn draw-off pipe can be displaced axially. It is especially advantageous if the inclined surface is sufficiently long in the axial direction, because this makes it possible to accept greater tolerances while still ensuring that the yarn draw-off pipe can be positioned correctly in the axial direction.

An advantageous design of the yarn draw-off pipe is achieved if a surface is provided which is parallel to the longitudinal axis of the bushing, as this makes it possible to easily guide the yarn draw-off pipe in its holder in a radial direction. It is especially advantageous if this surface is made in the form of a circumferential surface of a cylinder. If the holder of a yarn draw-off pipe is designed according to the proposed invention, correct axial position of the yarn draw-off pipe in the spinning device is ensured in a simple manner. It is especially advantageous in this case for the holder to be provided with a bore, the wall of which has a slit into which an elastic element is engaged at a right angle to the bore. This makes it possible for the elastic element to be fixed in the axial direction, this being achieved through the wall of the holder, and for the elastic element to be able to reach sufficiently far in the radial direction into the bore to be able to act upon the inclined surface of the yarn draw-off nozzle. If two slits across from each other are provided, an elastic element can be retained easily. It is then especially advantageous to make it in form of a U-shaped element so that one leg reaches into each of the slits. As a result, even force is exerted upon the yarn draw-off pipe in axial direction. At the same time it is also possible to simply retain the elastic element by itself.

The invention is described below through embodiments illustrated in the drawings.

BRIEF DESCRIPTION OF THE DRAWINGS

FIG. 3 shows a rear top view of the mounting plate with a holder according to the invention, with a U-shaped elastic element.

DETAILED DESCRIPTION OF THE PREFERRED EMBODIMENTS

Figure 1:
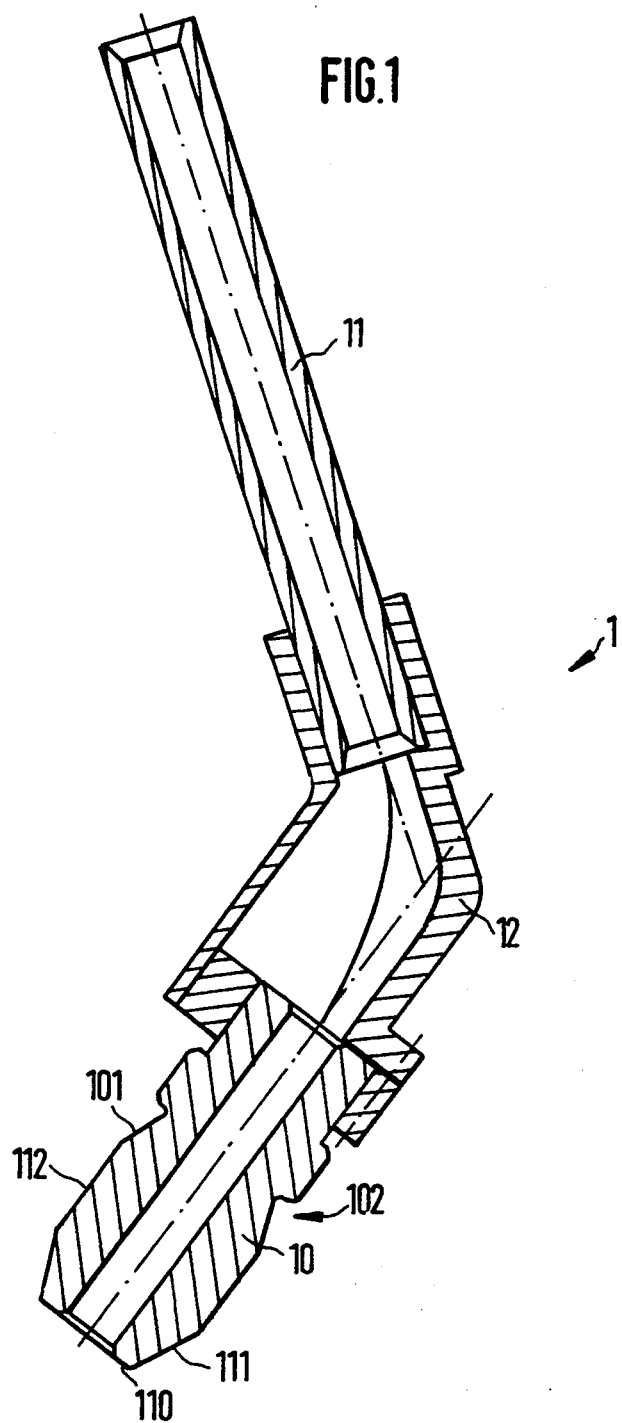
FIG. 1 shows a cut-away view through a yarn draw-off pipe according to the invention.

Reference will now be made in detail to the presently preferred embodiments of the invention, one or more examples of which are illustrated in the drawings. Each example is provided by way of explanation of the invention, and not limitation of the invention. The numbering of components is consistent throughout the application, with the same components having the same number throughout.

FIG. 1 shows a cut-away view of a yarn draw-off pipe 1. It consists of its bushing 10 and the yarn guiding pipe 11 which is connected to the bushing 10 via an intermediary element 12. The yarn draw-off pipe can be oriented with its front 110 in the direction of a yarn draw-off nozzle of an open-end spinning machine (FIG. 2) and in the latter. The yarn draw-off pipe 1 of FIG. 1 is equipped with a bushing 10 which is made in the form of a dynamically balanced element. In order to be positioned in its axial sense, the yarn draw-off pipe 1 is provided with an inclined surface 101 which is here made in form of a conical segment 102. An elastic element acts upon it in the radial direction so that a force is produced in the axial direction over the inclined surface and pushes the yarn draw-off pipe 1 in the direction of its front 110, retaining it thereby in a holder.

The yarn draw-off pipe 1 is provided with another surface 111, conical in this case, between the inclined surface 101 and the front 110. It serves to lift an elastic element extending into the yarn draw-off pipe 1 radially when the yarn draw-off pipe 1 is inserted, so that the yarn draw-off pipe 1 may be moved in the axial direction.

Figure 2:
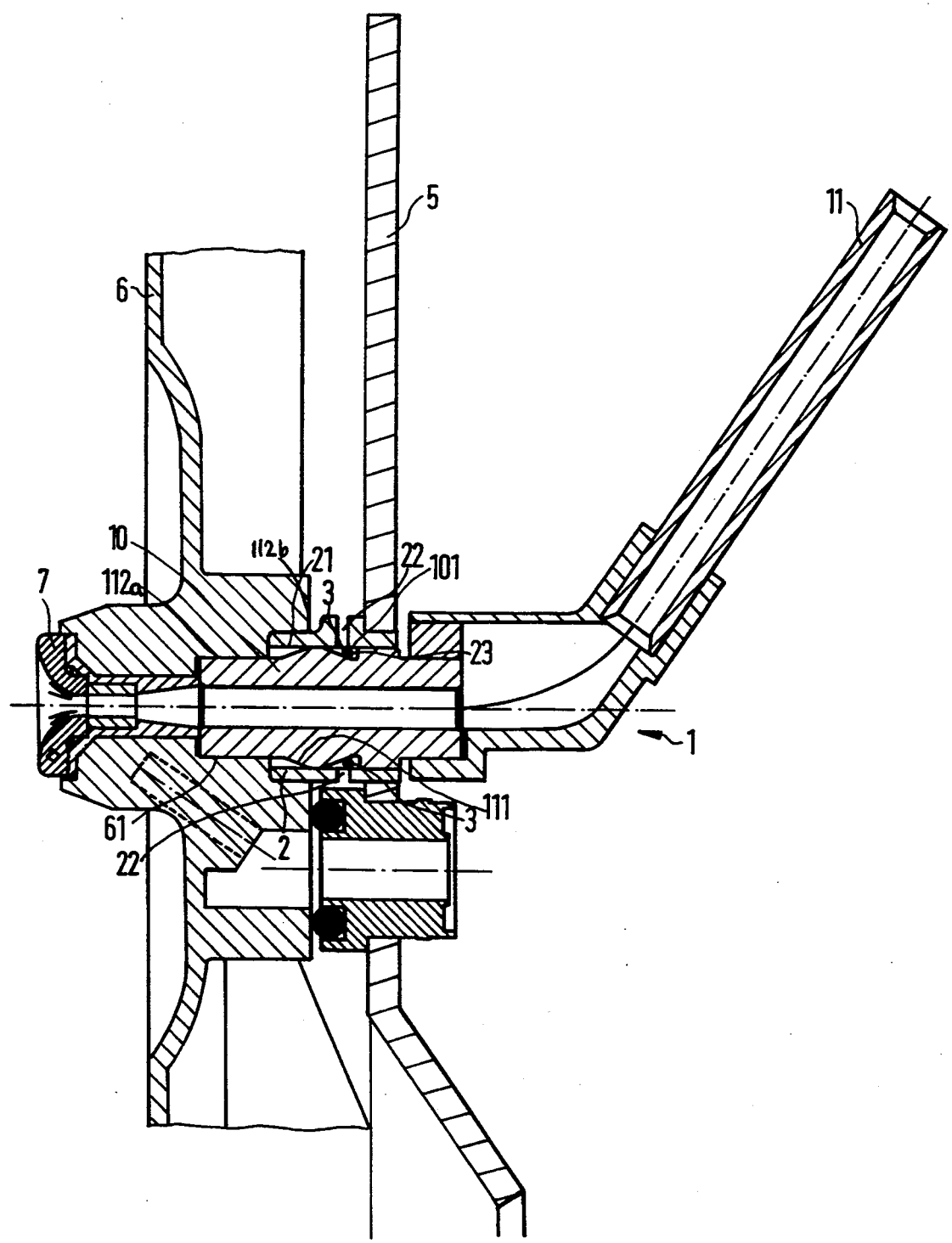
FIG. 2 shows a cut-away view of another embodiment of a yarn draw-off pipe in its holder on the cover of a spin box.

FIG. 3 shows a holder 2 without yarn draw-off pipe in the position which occurs when a yarn draw-off pipe is to be introduced into the holder 2. The surface 111 causes the diameter of the yarn draw-off pipe 1 to decrease towards its front, so that it may be inserted between several elastic elements or an U-shaped elastic element 3 extending into the holder 2 of the yarn draw-off pipe 1 without blockage of its front 110 by the elastic element 3. For this purpose the diameter of the front 110 is advantageously smaller than the distance still left free by the elastic element (compare with FIG. 3, A). The yarn draw-off pipe 1 is provided between surface 111 and the inclined surface 101 with a surface 112 (FIG. 1) which is parallel to its longitudinal bushing axis. In the embodiment illustrated in FIG. 2, surface 112b is shorter in length than surface 112 of the embodiment illustrated in FIG. 1. This makes it possible for the yarn draw-off pipe 1 to be displaced radially in its holder 2. The yarn draw-off pipe 1 shown in FIG. 2 is equipped with a bushing 10 where the surface 112b follows front 110 immediately in axial direction. Axial guidance is therefore achieved in this case by the rotor cover 6 which thus becomes part of the holder 2 of the yarn draw-off pipe 1.

FIG. 2 shows a cut-away view of a yarn draw-off pipe 1 according to the invention held in a holder 2 according to the invention which is attached to a mounting plate 5. On it, the rotor cover 6, which is part of an open-end rotor spinning device, is also attached. Holder 2 becomes in part a bore 61 of rotor cover 6. The radial guidance of the yarn draw-off pipe 1 is therefore effected in this case through the wall of the bore 61. The yarn draw-off nozzle 7, via which the yarn spun in a rotor is directly withdrawn from said rotor is installed on the rotor cover 6. The other parts of the rotor box and the rotor itself are not shown for the sake of simplification, as they are well known in the art. The holder 2 has two slits 22 across from each other which cut into the wall of its pipe-shaped round body so that an elastic element introduced radially is able to reach as far as the inside of bore 21 of holder 2. This makes it passible for the elastic element 3 to reach the inclined surface 101 of the yarn draw-off pipe 1 and to exert a radial force upon the inclined surface 101 of the yarn draw-off pipe 1 so that the latter is pushed in the direction of the yarn draw-off nozzle. The holder is provided with two slits 22 across from each other. The elastic element 3 is here in form of a spring wire which presses tangentially against the inclined surface 101 of the yarn draw-off pipe 1.

Due to the fact that the elastic element is U-shaped, as can be seen in FIG. 3, it is possible to ensure with one component that an elastic element acts upon the inclined surface 101 of the yarn draw-off pipe in each slit 22. At the same time, this also makes it possible for the elastic element 3 to take up its position automatically in the holder 2. The holder 2 is made in this case as an autonomous component mounted on the mounting plate 5 and which is continued in bore 61 of rotor cover 6. It is however also possible to design the holder 2 as an integral part of the mounting plate 5 or in the rotor cover 6.

The advantages of the yarn draw-off pipe according to the invention appear clearly from FIG. 2. In order to disassemble it, it is merely necessary to pull the yarn draw-off pipe out of its holder 2 opposite the direction of the yarn draw-off nozzle 7. The elastic element 3 is thereby widened radially so that the yarn draw-off pipe 1 can be pulled out of the embrace of the elastic element 3. It is equally simple to insert the yarn draw-off pipe 1 in the holder 2. The surface 112a which is parallel to the bushing 10 has a diameter smaller than the distance between the legs of the elastic element 3, so that the yarn draw-off pipe 1 can be inserted between these. During the insertion movement of the yarn draw-off pipe, the surface 111 then glides along the elements of the elastic element 3 and pushes them radially outward, so that an axial movement of the yarn draw-off pipe is not blocked. As the insertion movement continues, the elastic element 3 comes into the zone of the inclined surface 101, so that an axial force is produced, acting upon the yarn draw-off pipe as a result of the radial force acting upon the sloped plane of the inclined surface. This causes the yarn draw-off pipe 1 to be positioned axially in its holder 2. The axial extension of the inclined surface should be selected of such dimension as to ensure that the yarn draw-off pipe 1 will reach its operating position before the elastic element 3 reaches the end of the inclined surface. Care should also be taken to ensure that when the yarn draw-off pipe is axially in position, the elastic element still exerts sufficient force upon the inclined surface 101.

Twisting of the yarn draw-off pipe 1 is prevented through the fact that the yarn guiding pipe 11 is guided out through a bore in the cover of the spinning device (not shown). It is however also possible to prevent twisting of the yarn draw-off pipe 1 by designing the bushing 10 so as not to be dynamically balanced.

FIG. 3 shows a top view of the mounting plate 5 of FIG. 2, as seen from the yarn guiding pipe 11. The elastic element 3 is therefore indicated for the most part by broken lines, as it is not actually visible. The elastic element enters bore 21 of holder 2 through the slits 22 (compare with FIG. 2), so that in the drawing of FIG. 3, this part of the elastic element 3 is indicated by broken lines. The elastic element 3 is U-shaped and attached to the mounting plate 5 by a rivet 32. The distance A between the two legs of the elastic element 3 is coordinated with the front 110 of the yarn draw-off pipe 1 in such a manner that the latter at first fits between the legs as it is inserted into the holder 2, with the elastic element 3 taking effect only as the axial movement is continued. This advantageously ensures that the yarn draw-off pipe 1 can be inserted into the holder 2 without having to take into consideration the position of an elastic element or of an attaching element. A yarn draw-off pipe 1 according to the invention is however also able to interact with a holder which, together with the yarn draw-off pipe, forms a spring-loaded latch, e.g. if it is made itself of an elastic material. In this case the elastic element would be replaced, e.g. by a rigid annular collar inside holder 2, and the inclined surface 101 would be given a very steep slope, or be made with a jump in diameter.

It will be apparent to those skilled in the art that various modifications and variations can be made in the present invention without departing from the scope or spirit of the invention. For example, features illustrated or described as part of one embodiment can be used in another emobiment to yield a still further embodiment. Thus, it is intended that the present invention cover such modifications and variations as come within the scope of the appended claims and their equivalents.

We claim:

1. A yarn draw-off pipe configured for guiding yarn out of a yarn forming zone and yarn draw-off nozzle of a textile machine, said yarn draw-off pipe comprising:
    a yarn guide pipe section;
    a bushing configured in communication with said yarn guide pipe section so that yarn is withdrawn through said bushing and said yarn guide pipe section, said bushing defining a seating surface upon which an elastic element bears, said seating surface defining a first inclined surface which is slanted in the longitudinal direction towards said yarn guide pipe section, said bushing further comprising a front end and a second inclined surface defined between said front end and said first inclined surface, said second inclined surface being slanted in a direction opposite to that of said first inclined surface; and
    wherein a force of an elastic element exerted against said first inclined surface generates an axial force on said bushing opposite to said yarn guide pipe section.

2. The yarn draw-off pipe as in claim 1, wherein said seating surface comprises a circumferential recess about said bushing.

3. The yarn draw-off pipe as in claim 2, wherein said recess defines a substantially conical segment defined about said bushing having a smaller diameter end oriented towards said yarn guide pipe section.

4. The yarn draw-off pipe as in claim 1, wherein said bushing further comprises a surface parallel to the longitudinal axis of said bushing and disposed between said first and second inclined surfaces.

5. The yarn draw-off pipe as in claim 1, wherein said bushing comprises a surface parallel to the longitudinal axis of said bushing and disposed between said first inclined surface and said front end.

6. The yarn draw-off pipe as in claim 1, further comprising an angled intermediary element disposed between said bushing and said yarn guide pipe section.

7. A yarn forming textile machine having a yarn forming zone, said textile machine comprising:
    a yarn guide pipe section;
    a bushing configured in communication with said yarn guide pipe section so that yarn is withdrawable through said bushing and said yarn guide pipe section, said bushing defining a seating surface upon which an elastic element bears, said seating surface defining a first inclined surface which is slanted in the longitudinal direction towards said yarn guide pipe section;
    a holder configured for receiving said bushing, said holder comprising a bore into which said bushing is inserted, said holder further comprising at least one slit defined therein generally perpendicular to the longitudinal axis of said bore;
    an elastic element received about said holder, at least a section of said elastic element extending into said bore through said slit; and
    wherein said elastic element exerts a force against said inclined surface of said bushing generating an axial force on said bushing opposite to said yarn guide section.

8. The machine as in claim 7, wherein said machine comprises an open-end spinning machine, said holder being attached to a mounting plate and a rotor cover of said spinning machine.

9. The machine as in claim 7, wherein said holder comprises at least two said slits disposed radially across from each other wherein said elastic element extends into said bore through said slits defining a passage through said bore for said bushing.

10. The machine as in claim 9, wherein said elastic element comprises a U-shaped element, said bushing being removable from said holder without disassembly of said U-shaped element from said holder.

* * * * *